United States Patent
Stolzer et al.

[15] 3,705,928
[45] Dec. 12, 1972

[54] O-ALKYL-N-MONOALKYLAMIDO-(THIONO)THIOLPHOSPHORIC ACID S-(N',N'DIALKYLAMINO-CARBAMYL)-METHYL ESTERS

[72] Inventors: Claus Stolzer, Wuppertal-Elberfeld; Ingeborg Hammann, Koeln; Gunter Unterstenhofer, Opladen, all of Germany

[73] Assignee: Farbenfabriken Bayer Aktiengesellschaft, Leverkusen, Germany

[22] Filed: April 20, 1970

[21] Appl. No.: 30,357

[30] Foreign Application Priority Data

April 23, 1969 Germany..........P 19 20 503.9

[52] U.S. Cl.................260/923, 260/487, 260/544 Y, 260/561 H, 260/924, 260/941, 260/959, 260/978, 260/984, 424/211
[51] Int. Cl...........................C07f 9/24, A01n 9/36
[58] Field of Search......................260/923

[56] References Cited

UNITED STATES PATENTS 3,518,327  6/1970  Fearing et al...............260/923

OTHER PUBLICATIONS

Soviet Inventions Illustrated, Jan., 1967, 5: Gen. Org. p. 6.

*Primary Examiner*—Lewis Gotts
*Assistant Examiner*—Anton H. Sutto
*Attorney*—Burgess, Dinklage and Sprung

[57] ABSTRACT

O-alkyl-N-monoalkylamido-(thiono)thiolphosphoric acid S-(N', N'-dialkylaminocarbamyl)-methyl esters, which may be substituted on the methyl ester group and which possess arthropodicidal, especially acaricidal and insecticidal, properties, and a process for their production.

11 Claims, No Drawings

O-ALKYL-N-MONOALKYLAMIDO-(THIONO)THIOLPHOSPHORIC ACID S-(N',N'-DIALKYLAMINO-CARBAMYL)-METHYL ESTERS

The present invention relates to and has for its objects the provision of particular new 0-alkyl-N-monoalkylamido-(thiono)thiolphosphoric acid S-(N',N'-dialkylamino-carbamyl)-methyl esters, which may be substituted on the methyl ester group and which possess arthropodicidal, especially insecticidal and acaricidal, properties, active compositions in the form of mixtures of such compounds with solid and liquid dispersible carrier vehicles, and methods for producing such compounds and for using such compounds in a new way especially for combatting pests, e.g., arthropods, especially insects and acarids, with other and further objects becoming apparent from a study of the within specification and accompanying examples. e.g.

It is known from Belgian Pat. specification No. 579,855 and U.S.S.R. Pat. specifications No. 181,441, 185,913 and 191 265 that 0,0-dialkylthiolphosphoric acid S-(N',N'-dialkylaminocarbamyl)-methyl esters and their thionothiol analogues exhibit insecticidal and acaricidal activity.

It is further known from Belgian Pat. specification No. 713,363 that, in general, 0,0-dialkyl-(thiono)thiolphosphoric acid S-(hydrazidocarbonyl)-methyl esters and alkyl-(thiono) thiolphosphonic acid 0-alkyl-S-(hydrazidocarbonyl)-methyl esters possess an insecticidal and acaricidal activity.

It has now been found, in accordance with the present invention, that the particular new 0-alkyl-N-mono-alkylamido-(thiono)thiolphosphoric acid S-(N',N'-dialkylamino-carbamyl)-methyl esters of the general formula $$\begin{array}{c} R-NH \quad Y \quad R'' \quad\quad R^{IV} \\ \diagdown \| \quad | \quad\quad \diagup \\ P-S-C-CO-NH-N \\ \diagup \quad\quad | \quad\quad \diagdown \\ R'-O \quad\quad R''' \quad\quad R^{IV} \end{array} \quad (I)$$

in which

R and R' are straight-chain or branched alkyl with one to six carbon atoms,
R'' is hydrogen or optionally substituted lower alkyl,
R''' is hydrogen, optionally substituted lower alkyl or aryl,
$R^{IV}$ each is the same or a different lower alkyl or lower alkenyl and
X is oxygen or sulphur, exhibit strong arthropodicidal, especially insecticidal and acaricidal, properties.

It has been furthermore found, in accordance with the present invention, that the particular new compounds of formula (I) above may be produced by several different processess. In one variant, (a) an alkali metal salt, alkaline earth metal salt or ammonium salt of an 0-alkyl-N-monoalkyl-amido-mono- or -dithiophosphoric acid of the general formula $$\begin{array}{c} R-NH \quad X \\ \diagdown \| \\ P-SM \\ \diagup \\ R'-O \end{array} \quad (II)$$

in which
R, R' and X have the significance given above, and

M is an alkali metal or alkaline earth metal equivalent or a (possibly mono-, di-, tri- or tetra-alkylated) ammonium group is reacted with a halo acetic acid ester of the formula $$\begin{array}{c} R'' \\ | \\ Hal-C-CO-O-A \\ | \\ R''' \end{array} \quad (III)$$

in which

Hal is chlorine or bromine,
A is optionally substituted alkyl or phenyl, and
R'' and R''' have the significance given above, so as to produce an ester of the formula $$\begin{array}{c} R-NH \quad X \quad R'' \\ \diagdown \| \quad | \\ P-S-C-CO-O-A \\ \diagup \quad\quad | \\ R'-O \quad\quad R''' \end{array} \quad (IV)$$

in which

R, R', R'', R''', X and A have the meanings given above and the ester of the formula (IV) is aminolyzed by means of a N,N-dialkylhydrazine of the formula $$\begin{array}{c} R^{IV} \\ \diagup \\ H_2N-N \\ \diagdown \\ R^{IV} \end{array} \quad (V)$$

in which $R^{IV}$ has the above mentioned significance to give the product of formula (I), or in another variant b. an alkali metal salt, alkaline earth metal salt or ammonium salt of formula (II) is reacted with a haloacetic acid N', N'-dialkylhydrazide of the formula $$\begin{array}{c} R'' \quad\quad R^{IV} \\ | \quad\quad \diagup \\ Hal-C-CO-NH-N \\ | \quad\quad \diagdown \\ R''' \quad\quad R^{IV} \end{array} \quad (VI)$$

in which

Hal, R'', R''' and $R^{IV}$ have the significance given above, or c. an alkali metal, alkaline earth metal or ammonium salt of formula (II) is reacted in a single-pot reaction with a haloacetic acid halide of the formula $$\begin{array}{c} R'' \quad O \\ | \quad \diagup\!\!\!\diagup \\ Hal-C-C \\ | \quad \diagdown \\ R''' \quad Hal \end{array} \quad (VII)$$

in which

Hal, R'' and R''' have the above mentioned significance, and thereafter with a N,N-dialkylhydrazine (V), optionally in the presence of an acid-binding agent, or d. an 0-alkyl-N-monoalkylamido-(thiono)phosphoric acid halide of the formula $$\begin{array}{c} R-NH \quad X \\ \diagdown \| \\ P-Hal \\ \diagup \\ R'-O \end{array} \quad (VIII)$$

in which

R, R', X and Hal have the above mentioned significance, is reacted, in the presence of an acid-binding agent, with a 2-mercaptocarboxylic acid-N',N'-dialkylhydrazide of the formula

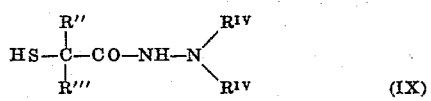

in which
R'', R'41 and $R^{IV}$ have the above mentioned significance.

Surprisingly, the 0-alkyl-N-monoalkylamido-(thiono) thiolphosphoric acid S-(N',N'-dialkylaminocarbamyl)-methyl esters show a remarkably better insecticidal and acaricidal as well as systemic activity (despite lower toxicity to warm-blooded animals) than the 0,0-dialkyl-(thiono)thiolphosphoric acid-S-(hydrazido-carbonyl)-methyl esters and alkyl-(thiono)thiolphosphonic acid-0-alkyl-S-(hydrazido-carbonyl)-methyl esters which are the nearest known active substances of the same type of activity. The compounds of the present invention therefore represent a valuable contribution to the art.

Where the triethylammonium salt of 0-ethyl-N-methylamidodithiophosphoric acid and chloroacetic acid phenyl ester are used as starting materials in accordance with process variant (a), the course of this reaction can be represented by the following formula scheme:

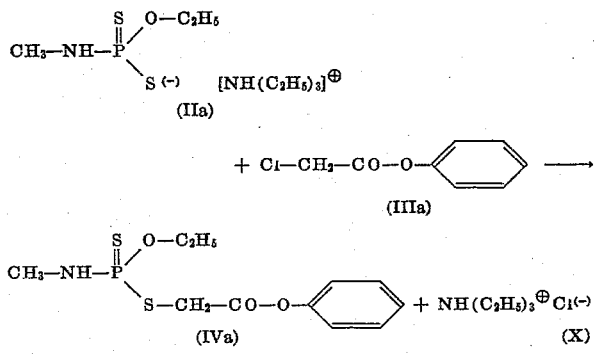

In the second step, the ester IVa obtained above is reacted with N,N-dimethylhydrazine in accordance with the following reaction scheme:

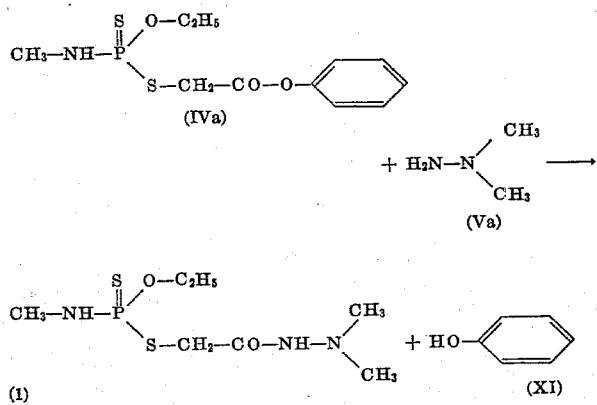

The phenol liberated is removed by washing with a solution of alkali.

The process variants (b), (c) and (d) can be formulated in corresponding manner.

The alkali metal, alkaline earth metal or ammonium salts required for the preparation of substances according to the invention according to process variants (a), (b) and (c) are generally defined by formula (II).

The N,N-dialkylhydrazines required according to process variants (a) and (c) are defined by formula (V).

Advantageously, in accordance with the present invention, in the various formulas herein:
R and R' represent
alkyl with one to four carbon atoms such as methyl, ethyl, n- and iso-propyl, n-, iso-, sec.- and tert.-butyl, and the like, especially $C_{1-3}$;
R'' represents
hydrogen, methyl or ethyl, and preferably hydrogen;
R''' represents
hydrogen, methyl, ethyl or phenyl which may be halogen substituted, preferably hydrogen or methyl; and $R^{IV}$ represents
lower alkyl with one to three carbon atoms or lower alkenyl with two to three carbon atoms
such as methyl, ethyl, n- and iso-propyl, and allyl.

In formulas (III), (VI), (VII) and (VIII), Hal is preferably chlorine or bromine.

The starting materials (II), (III), (V), (VI), (VII), (VIII) and (IX) are known.

For the preparation of the substances according to the invention, the process variant (a) is particularly suitable. Here, in the first reaction step approximately equimolar amounts of salts of formula (II) and 2-chloro- or 2-bromo-acetic acid esters may be reacted. In individual cases it has proved expedient to use the salts of formula (II) in excess. The reaction normally takes place at 0° to 100° C., preferably 20° to 70° C. The reaction may be effected in the presence of a solvent, and for this purpose all organic solvents inert under the conditions of the reaction are suitable, especially those of polar nature, such as alcohols, ketones, acetonitrile and water. The isolation of the intermediate products of formula (IV) may take place; this may be done (if water is not already used as solvent) by pouring the reaction mixture into water, taking up the oily product of formula (IV) in a water-immiscible solvent, such as benzene, toluene, dichloromethane or ether, washing until there is a neutral reaction, drying the organic phase, filtering off and concentrating the filtrate. The product of formula (IV) may then be reacted, in a second step, generally at a temperature of 0° to 100° C., preferably 20° to 40° C., with a N,N-dialkylhydrazine of formula (V), normally in the molar ratio of approximately 1:2. An excess of N,N-dialkylhydrazine is necessary for quantitative aminolysis. As solvents, again all solvents inert to the reactants are suitable, preferably chlorinated aliphatic hydrocarbons, for example di- and tri-chloromethane. In many cases, however, it is advantageous to dispense entirely with solvents in the aminolysis. To isolate the novel active compounds of formula (I), the reaction mixture, in the inert solvent, may be freed from the formed phenol by washing with water and a dilute solution of alkali, the organic phase may be dried, the drying agent filtered off, and the filtrate concentrated.

The substances according to the invention are systemic insecticides and acaricides of strong potency. In particular, they can be used to control numerous insects and mites which are resistant to conventional insecticidal agents. In addition, some of the products possess rodenticidal activity. The pesticidal effect sets in rapidly and is long-lasting. The products may therefore be used in crop protection and in the protection of stored products, as well as in the hygiene field, for the control of noxious sucking and biting insects, Diptera and mites (Acari).

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus;* and the like.

In the case of the biting insects contemplated herein, above all there should be mentioned butterfly caterpillars Lepidoptera such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like Also to be classed with the biting insects contemplated herein are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprises essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonchus ulmi*), blister mites for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay as well as by a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g.) methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, (e.g. alkali silicates, etc.); whereas the following may be chiefly considered for use as conventional carrier vehicle assistants, (e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixture with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g. about 20–100 percent by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Myzus test (contact action)
Solvent: 3 parts by weight acetone
Emulsifier: 1 part by weight alkylaryl polyglycol ether To produce a suitable preparation of the particular active compound, 1 part by weight of the active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation time and the results can be seen from Table 1:

TABLE 1.—(PLANT-DAMAGING INSECTS)

Myzus test

| Active compounds | Concentration of active compound in percent | Degree of destruction in percent after 24 hours |
| --- | --- | --- |
| (A) $(C_2H_5O)_2\overset{S}{\overset{\parallel}{P}}-S-CH_2-\overset{O}{\overset{\parallel}{C}}-NH-N\overset{CH_3}{\underset{CH_3}{\diagdown}}$ (known) | 0.1<br>0.01 | 95<br>30 |
| (1) $\overset{C_2H_5O}{\underset{CH_3-NH}{\diagdown}}\overset{S}{\overset{\parallel}{P}}-S-CH_2-\overset{O}{\overset{\parallel}{C}}-NH-N\overset{CH_3}{\underset{CH_3}{\diagdown}}$ | 0.1<br>0.01<br>0.001 | 100<br>100<br>20 |

TABLE 1.—(PLANT-DAMAGING INSECTS)—Continued

Myzus test

| Active compounds | Concentration of active compound in percent | Degree of destruction in percent after 24 hours |
|---|---|---|
| (2) $C_2H_5O\diagdown\underset{CH_3-NH\diagup}{\overset{O}{\underset{\|}{P}}}-S-CH_2-\overset{O}{\underset{\|}{C}}-NH-N\diagdown\overset{CH_3}{\diagup}_{CH_3}$ | 0.1<br>0.01 | 98<br>90 |
| (3) $nC_3H_7O\diagdown\underset{CH_3-NH\diagup}{\overset{S}{\underset{\|}{P}}}-S-CH_2-\overset{O}{\underset{\|}{C}}-NH-N\diagdown\overset{CH_3}{\diagup}_{CH_3}$ | 0.1<br>0.01 | 100<br>99 |
| (4) $C_2H_5O\diagdown\underset{iC_3H_7NH\diagup}{\overset{S}{\underset{\|}{P}}}-S-CH_2-\overset{O}{\underset{\|}{C}}-NH-N\diagdown\overset{C_3H_7n}{\diagup}_{C_3H_7n}$ | 0.1<br>0.01 | 100<br>60 |

EXAMPLE 2

Tetranychus test

Solvent: 3 parts by weight acetone

Emulsifier: 1 part by weight alkylaryl polyglycol ether

To produce a suitable preparation of the particular active compound, 1 part by weight of the active compound is mixed with the stated amount of solvent containing the stated amount of emulsifier and the concentrate so obtained is diluted with water to the desired final concentration.

Bean plants (Phaseolus vulgaris), which have a height of approximately 10–30 cm., are sprayed with the preparation of the active compound until dripping wet. These bean plants are heavily infested with spider mites (Tetranychus urticae) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from Table 2:

EXAMPLE 3

Tetranychus test (lasting effect after spraying)

Solvent: 3 parts by weight acetone

Emulsifier: 1 part by weight alkylaryl polyglycol ether

To produce a suitable preparation of the particular active compound, 1 part by weight of the active compound is mixed with the stated amount of solvent containing the stated amount of emulsifier, and the concentrate is diluted with water to the desired final concentration.

Bean plants (Phaseolus vulgaris), which have a height of approximately 10–30 cm., are sprayed with the preparation of the active compound until dripping wet.

After the specified periods of time, the plants are infested with spider mites (Tetranychus urticae resistant) and their mortality is in each case determined after 3 days by counting the dead mites. The degree of destruction thus obtained is expressed as a percentage: 100 percent means that all the spider mites were killed; 0 percent means that none of the spider mites were killed.

The active compounds, the concentrations of the active compounds, the evaluation times and the results can be seen from Table 3:

TABLE 2.—(PLANT-DAMAGING MITES)

Tetranychus test

| Active compounds | Concentration of active compound in percent | Degree of destruction in percent after 48 hours |
|---|---|---|
| (A) $(C_2H_5O)_2\overset{S}{\underset{\|}{P}}-S-CH_2-\overset{O}{\underset{\|}{C}}-NH-N\diagdown\overset{CH_3}{\diagup}_{CH_3}$<br>(known) | 0.1<br>0.01<br>0.001 | 100<br>99<br>0 |
| (1) $C_2H_5O\diagdown\underset{CH_3-NH\diagup}{\overset{S}{\underset{\|}{P}}}-S-CH_2-\overset{O}{\underset{\|}{C}}-NH-N\diagdown\overset{CH_3}{\diagup}_{CH_3}$ | 0.1<br>0.01<br>0.001 | 100<br>100<br>100 |
| (5) $C_2H_5O\diagdown\underset{iC_3H_7-NH\diagup}{\overset{O}{\underset{\|}{P}}}-S-CH_2-\overset{O}{\underset{\|}{C}}-NH-N\diagdown\overset{CH_3}{\diagup}_{CH_3}$ | 0.1<br>0.01<br>0.001 | 100<br>99<br>40 |

3,705,928

TABLE 3 (PLANT-DAMAGING MITES)

Lasting effect after spraying: *Tetranychus urticae* (resistant)/*Phaseolus vulgaris*

| Active compounds | Percent active compound in the spray liquor | Percent destruction after— | | | |
|---|---|---|---|---|---|
| | | 3 | 6 | 10 | 13 |
| (A) C₂H₅O\P(=S)−S−CH₂−C(=O)−NH−N(CH₃)(CH₃), C₂H₅O/ (known) | 0.05 | 100 | 55 | 30 | 0 |
| (B) C₂H₅O\P(=S)−S−CH₂−C(=O)−NH−H(CH₃), C₂H₅/ (known) | 0.05 | 100 | 100 | 20 | 0 |
| (5) C₂H₅O\P(=O)−S−CH₂−C(=O)−NH−N(CH₃)(CH₃), i-C₃H₇NH/ | 0.05 | 100 | 100 | 65 | 30 |

EXAMPLE 4

Toxicity test (rat per os)

In a screening test, 3 to 5 female rats receive the particular active compound in aqueous emulsion administered with the oseophageal sound. As emulsifier, alkylaryl polyglycol ether is used. The observation period is 7 days.

The active compounds investigated and the test results obtained can be seen from Table 4:

TABLE 4.—TOXICITY TEST

Rat per os

| Active compounds | Mg./kg., LD₅₀ |
|---|---|
| (A) (C₂H₅O)₂P(=S)−S−CH₂−C(=O)−NH−N(CH₃)(CH₃) (known) | 5–10 |
| (B) C₂H₅\P(=S)−S−CH₂−C(=O)−NH−N(CH₃)(CH₃), C₂H₅O/ (known) | 5–10 |
| (6) C₂H₅O\P(=S)−S−CH(CH₃)−C(=O)−NH−N(CH₃)(CH₃), CH₃−NH/ | 1,000 |
| (1) C₂H₅O\P(=S)−S−CH₂−C(=O)−NH−N(CH₃)(CH₃), CH₃−NH/ | 100–250 |
| (2) C₂H₅O\P(=O)−S−CH₂−C(=O)−NH−N(CH₃)(CH₃), CH₃−NH/ | 25–50 |
| (7) C₂H₅O\P(=S)−S−CH₂−C(=O)−NH−N(CH₃)(CH₃), iC₃H₇−NH/ | 1,000 |
| (5) C₂H₅O\P(=O)−S−CH₂−C(=O)−NH−N(CH₃)(CH₃), iC₃H₇−NH/ | 250 |

EXAMPLE 5

CH₃−NH\P(=S)−S−CH₂−CO−NH−N(CH₃)(CH₃)
C₂H₅−O/    (1)

A stream of dry hydrogen sulphide is introduced at 10° C. for 30 minutes into a solution of 1,000 ml acetonitrile and 227 g (2.246 moles) triethylamine. After this, 195 g (1.123 moles) O-ethyl-N-monomethyl amidothionophosphoric acid chloride are added dropwise at the same temperature, with further introduction of hydrogen sulphide. Stirring is continued for about 5 hours by slowly bubbling in a stream of hydrogen sulphide, and 191.5 g (1.123 moles) of chloroacetic acid phenyl ester are then added slowly at about 20° C. Finally, stirring is continued overnight at room temperature; this is followed by pouring into water, taking up with ben-zene, washing the benzene solution until neutral, and then subjecting it to drying over sodium sulphate, filtration and concentration. 256 g (74.8 percent of the theory) of O-ethyl-N-monomethylamidothionothiolphosphoric acid S-(carbophenoxy)-methyl ester are obtained as yellow oil.

To 241.7 g. (0.792 mole) of this intermediate product there are slowly added at room temperature, with stirring, 95 g (1.584 moles) N,N-dimethylhydrazine. Stirring is continued for 4 hours at room temperature; this is followed by taking up in dichloromethane, washing until neutral first with water, then twice with dilute solution of sodium hydroxide and finally with water, drying with sodium sulphate, filtration and concentration. 96.6 g (45 percent of the theory) of O-ethyl-N-monomethylamidothionothiolphosphoric acid S-(N,N-dimethylaminocarbamyl)-methyl ester are obtained as a brown, viscous oil of refractive index $n_D^{23.5} = 1.5521$.

Analysis:

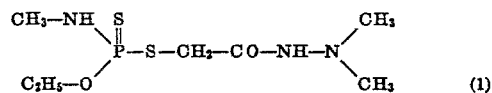

| | P | S |
|---|---|---|
| Calculated for C₇H₁₈N₃O₂PS₂ (molecular weight 271.4): | 11.43% | 23.60% |
| Found: | 11.34% | 22.89% |

EXAMPLE 6

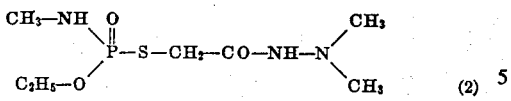

The compound is prepared, analogously to that of Example 5, from the potassium salt of OO-ethyl-N-monomethylamido-monothiolphosphoric acid (which is used directly as such and not produced in situ as in Example 5), bromoacetic acid phenyl ester and N,N-dimethylhydrazine. The O-ethyl-N-monomethylamidothiolphosphoric acid S-(N,N-dimethylaminocar-bamyl)-methyl ester is obtained as a brown viscous oil of refractive index $n_D^{21} = 1.5043$.
Yield: 35% of the theory.
Analysis:

|  | P | S |
|---|---|---|
| Calculated for $C_7H_{18}N_3O_3PS$ (molecular weight 255.3) | 12.16% | 12.55% |
| Found: | 12.20% | 12.05% |

EXAMPLE 7

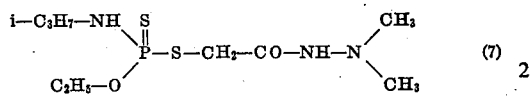

The compound is obtained, analogously to that of Example 5, from the triethylammonium salt of OO-ethyl-N-monoisopropyl-amidothionothiolphosphoric acid (prepared, as in Example 5, in situ from triethylamine, O-ethyl-N-mono-isopropylamidothionophosphoric acid chloride and hydrogen sulphide in acetonitrile), chloroacetic acid phenyl ester and N-dimethylhydrazine The O-ethyl-N-monoisopropyl-amidothionothiolphosphoric acid S-(N,N-dimethyl-aminocarbamyl)-methyl ester is obtained as a yellow oil of refractive index $n_D^{20} = 1.5358$.
Yield: 68.2% of the theory.
Analysis:

|  | P | S |
|---|---|---|
| Calculated for $C_9H_{22}N_3O_2PS_2$ (molecular weight 299.4): | 10.37% | 21.40% |
| Found: | 10.62% | 21.34% |

EXAMPLE 8

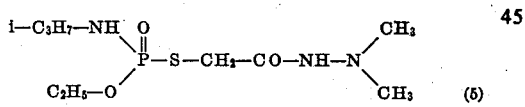

The compound is prepared, analogously with that of Example 5, from the potassium salt of O-ethyl-N-monoiso-propylamidomonothiophosphoric acid (which, in manner analogous with that stated in Example 5, is prepared in situ from potassium hydroxide and O-ethyl-N-monoisopropylamidothionophosphoric acid chloride in acetone/water and immediately further reacted in solution), bromoacetic acid phenyl ester and N,N-dimethylhydrazine. The O-ethyl-N-monoisopropylamidothiolphosphoric acid S-(N,N-dimethylaminocarbamyl)-methyl ester is obtained as brown, viscous oil of the refractive index $n_D^{22.5} = 1.5065$.
Yield: 27.5% of the theory.
Analysis:

|  | P | S |
|---|---|---|
| Calculated for $C_9H_{22}N_3O_3PS$ (molecular weight 283.3): | 10.94% | 11.30% |
| Found: | 10.60% | 10.75% |

EXAMPLE 9

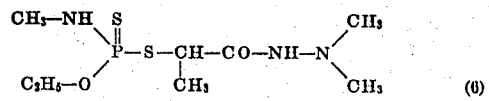

The compound is obtained, analogously with that of Example 5, from the triethylammonium salt of O-ethyl-monomethylamidodithiophosphoric acid (prepared, as in Example 5, in situ from triethylamine, O-ethyl-monomethylamidothionophosphoric acid chloride and hydrogen sulphide in acetonitrile), 2-bromopropionic acid phenyl ester and N,N-dimethylhydrazine. The O-ethyl-N-monomethylamidothionothiolphosphoric acid S-(1-N,N-dimethylaminocarbamyl)-ethyl ester is obtained as a soft-crystalline compound of the melting point 55°–57° C. Yield: 34% of the theory.
Analysis:

|  | P | S |
|---|---|---|
| Calculated for $C_8H_{20}N_3O_2PS_2$ (molecular weight 285.4): | 10.87% | 22.48% |
| Found: | 10.31% | 21.86% |

EXAMPLE 10

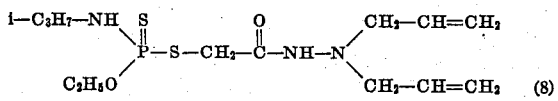

The compound is prepared, analogously with that of Example 5, from the sodium salt of O-ethyl-N-monoisopropyl-amidodithiophosphoric acid (which is used directly as such and not produced in situ as in Example 5), chloroacetic acid phenyl ester and N,N-diallylhydrazine with continuation of stirring for a longer period in the second reaction step. The O-ethyl-N-monoisopropylamidothionothiolphosphoric acid S-(N,N-di-allylaminocarbamyl)-methyl ester is obtained as yellow oil of the refractive index $n_D^{24.5} = 1.5340$.
Yield: 76.4% of the theory.

EXAMPLE 11

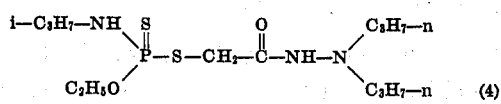

The compound is prepared, analogously with that of Example 5, from the sodium salt of O-ethyl-N-monoisopylamido-dithiophosphoric acid (which is used directly as such and not produced in situ as in Example 5), chloroacetic acid phenyl ester and N,N-di-n-propylhydrazine, with continuation of stirring for a longer period in the second reaction step. The O-ethyl-N-monoisopropylamidothionothiolphosphoric acid S-(N,N-di-n-propylaminocarbamyl)-methyl ester is obtained as yellow oil of the refractive index $n_D^{22} = 1.5182$.
Yield: 82.8% of the theory.

EXAMPLE 12

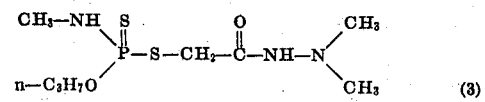

The compound is prepared, analogously with that of Example 5, from O-n-propyl-N-monomethylamidothionophosphoric acid chloride, triethylamine, hydrogen sulphide, chloroacetic acid phenyl ester and N,N-dimethylhydrazine. The O,O-ethyl-N-monomethylamidothionothiolphosphoric acid S-(N,N-dimethylaminocarbamyl)-methyl ester is obtained as yellow viscous oil of the refractive index $n_D^{25.5}$ = 1.5460.

Yield: 52.2% of the theory.

Analysis:
Calculated for $C_8H_{20}N_3O_2PS_2$ (molecular weight 285.4): P: 10.87%
Found: P: 10.88%

As may be used herein, the term "arthropod," "arthropodicidal and "arthropodicides" contemplate specifically both insects and acarids. Thus, the insects and acarids may be considered herein collectively as arthropods to be combated in accordance with the invention, and accordingly the insecticidal and/or acaricidal activity may be termed arthropodical activity, and the concomitant combative or effective amount used will be an arthropodicidally effective amount which in effect means an insecticidally or acaricidally effective amount of the active compound for the desired purposes.

It will be appreciated that the instant specification and example are set forth by way of illustration and not limitation, and that various modifications and changes may be made without departing from the spirit and scope of the present invention.

What is claimed is:

1. O-alkyl-N-monoalkylamido-(thiono)thiolphosphoric acid S-(N,N-dialkylaminocarbamyl)-methyl esters for the formula

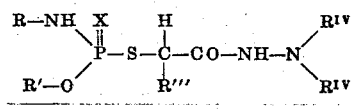

in which
R and R' are straight chain or branched alkyl with one to six carbon atoms,
R''' is hydrogen or methyl,
$R^{IV}$ each is the same or a different lower alkyl or allyl, and
X is oxygen or sulphur.

2. Compound according to claim 1 wherein R and R' are alkyl with one to four carbon atoms, R''' is hydrogen or methyl, and $R^{IV}$ is alkyl with one to three carbon atoms or allyl.

3. Compound according to claim 2 wherein R and R' are alkyl with one to three carbon atoms.

4. Compound according to claim 1 wherein such compound is O-ethyl-N-monomethylamidothionothiolphosphoric acid S-(N',N'-dimethylaminocarbamyl)-methyl ester of the formula

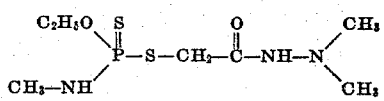

5. Compound according to claim 1 wherein such compound is O-ethyl-N-monomethylamidothiolphosphoric acid S-(N',N'-dimethylaminocarbamyl)-methyl ester of the formula

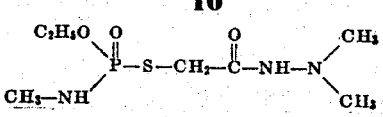

6. Compound according to claim 1 wherein such compound is O-ethyl-N-monoisopropylamidothiolphosphoric acid S-(N',N'-dimethylaminocarbamyl)-methyl ester of the formula

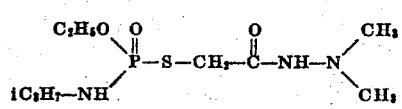

7. Compound according to claim 1 wherein such compound is O-ethyl-N-monomethylamidothionothiolphosphoric acid S-(1-N',N'-dimethylaminocarbamyl)-ethyl ester of the formula

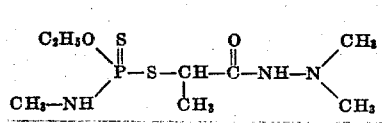

8. Compound according to claim 1 wherein such compound is O-ethyl-N-monoisopropylamidothionothiolphosphoric acid S-(N',N'-dimethylaminocarbamyl)-methyl ester of the formula

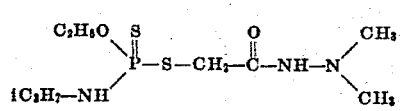

9. Compound according to claim 1 wherein such compound is O-ethyl-N-monoisopropylamidothionothiolphosphoric acid S-(N,N-dipropylaminocarbamyl)-methyl ester of the formula

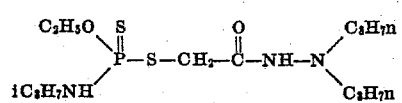

10. Compound according to claim 1 wherein such compound is O-ethyl-N-monoisopropylamidothionothiolphosphoric acid S-(N',N'-diallylaminocarbamyl)-methyl ester of the formula

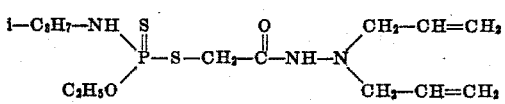

11. Compound according to claim 1 wherein such compound is O-n-propyl-N-monomethylamidothionothiolphosphoric acid S-(N',N'-dimethylaminocarbamyl)-methyl ester of the formula

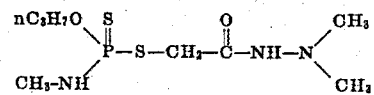

* * * * *